(12) United States Patent  
Anderson et al.

(10) Patent No.: US 9,094,138 B2  
(45) Date of Patent: Jul. 28, 2015

(54) AUTONOMOUS DATA SHARING AMONG SMART DEVICES

(75) Inventors: Erik Dean Anderson, Austin, TX (US); William Arthur Griffith, Austin, TX (US); Indran Naick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1069 days.

(21) Appl. No.: 13/168,555

(22) Filed: Jun. 24, 2011

(65) Prior Publication Data

US 2012/0327824 A1    Dec. 27, 2012

(51) Int. Cl.
| | |
|---|---|
| H04B 7/00 | (2006.01) |
| H04H 20/95 | (2008.01) |
| G06Q 10/08 | (2012.01) |
| H04L 12/24 | (2006.01) |
| H04H 20/61 | (2008.01) |

(52) U.S. Cl.
CPC .............. *H04H 20/95* (2013.01); *G06Q 10/08* (2013.01); *H04H 20/61* (2013.01); *H04L 41/22* (2013.01)

(58) Field of Classification Search
None
See application file for complete search history.

(56) References Cited

U.S. PATENT DOCUMENTS

| | | | |
|---|---|---|---|
| 7,130,895 B2 | 10/2006 | Zintel et al. ................... | 709/220 |
| 2005/0005130 A1* | 1/2005 | Okigami ........................ | 713/183 |
| 2007/0110014 A1* | 5/2007 | Mizuguchi .................... | 370/338 |
| 2009/0113088 A1 | 4/2009 | Illowsky et al. ................ | 710/62 |
| 2009/0177619 A1* | 7/2009 | Naito et al. ........................ | 707/1 |
| 2011/0095873 A1* | 4/2011 | Pratt et al. .................. | 340/12.28 |

OTHER PUBLICATIONS

Fergus et al., "A Semantic Framework for Self-Adaptive Networked Appliances," IEEE Consumer Communications and Networking Conference. Jan. 3-6, 2005.
deVos et al., "XML for CIM Model Exchange," IEEE, 2001.
Snell et al., "JSON Activity Streams 1.0," Activity Streams Working Group, May 18, 2011.
Atkins et al., "Atom Activity Streams 1.0," Activity Streams Working Group, Feb. 13, 2011.

* cited by examiner

*Primary Examiner* — Kibrom T Hailu
(74) *Attorney, Agent, or Firm* — VanLeeuwen & VanLeeuwen; William J. Stock

(57) ABSTRACT

An approach is provided in which a data collection system loads a user interface form on a display screen. The user interface form includes an entry field and an extraction formula with a corresponding element type that adheres to an industry-specific schema. The data collection system receives a data packet from a broadcast device, which includes an element value and an element type identifier adhering to the same industry-specific schema. In turn, the data collection system determines whether the element type identifier matches the element type and, if so, the data collection system populates the entry field on the display screen with the element value.

20 Claims, 9 Drawing Sheets

```
Healthcare (HL7) Schema-Based Data Packet
                    400

<recordTarget>
  <patientClinical>
  <id root="2.16.840.1.113883.19.1122.5" extension="444-22-2222"
  assigningAuthorityName="GHH Lab Patient IDs"/>
  <statusCode code="active"/>
    <patientPerson>
      <name use="L">
        <given>Eve</given>
        <given>E</given>
410 ——<family>Smith</family>
        </name>           —— 420
      <asOtherIDs>
        <id extension="AC555444444" assigningAuthorityName="SSN"
        root="2.16.840.1.113883.4.1"/>
      </asOtherIDs>
    </patientPerson>
  </patientClinical>
</recordTarget>
```

*FIG. 4*

```
Common Information Model (CIM) Schema-Based Data Packet
                          500
<cim:Substation ID="ID1" cim:PowerSystemResourceName="East">
  <cim:MemberOfCompany resource="#ID3">
  <cim:Contain>
     <cim:Breaker ID="ID2" cim:PowerSystemResourceName="11023"
     cim:Manufacturer="Admirable Electric" cim:NormalOpen="true"/>
  </cim:Contain>
</cim:Substation>
<cim:Company ID="ID3" CompanyName="BPA" >
  <cim:CompanyDescription>  ─ 510
     This is a government organization  ─ 520
  </cim:CompanyDescription>
</cim:Company>
```

*FIG. 5*

AUTONOMOUS DATA SHARING AMONG SMART DEVICES

BACKGROUND

The present disclosure relates to autonomous data sharing among smart devices. More particularly, the present disclosure relates to data collection devices and data broadcasting devices adhering to an industry-specific schema in order to autonomously exchange data.

In a smarter-planet environment, devices may be pre-configured and pre-programmed to actively exchange information between each other. For example, to track shipping packages using RFID tags, a systems developer may configure a system to listen for RFID events from specific RFID readers and display the RFID events on a display. In turn, "smarter projects" still require system developers to pre-determine and pre-configure particular attributes for data exchange between a sending device and a receiving device.

BRIEF SUMMARY

According to one embodiment of the present disclosure, an approach is provided in which a data collection system loads a user interface form on a display screen. The user interface form includes an entry field and an extraction formula with a corresponding element type that adheres to an industry-specific schema. The data collection system receives a data packet from a broadcast device, which includes an element value and an element type identifier adhering to the same industry-specific schema. In turn, the data collection system determines whether the element type identifier matches the element type and, if so, the data collection system populates the entry field on the display screen with the element value.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is a diagram showing an example of data packet information utilizing a healthcare industry-specific schema;

FIG. 5 is a diagram showing an example of data packet information utilizing a CIM industry-specific schema;

DETAILED DESCRIPTION

Figure 1:
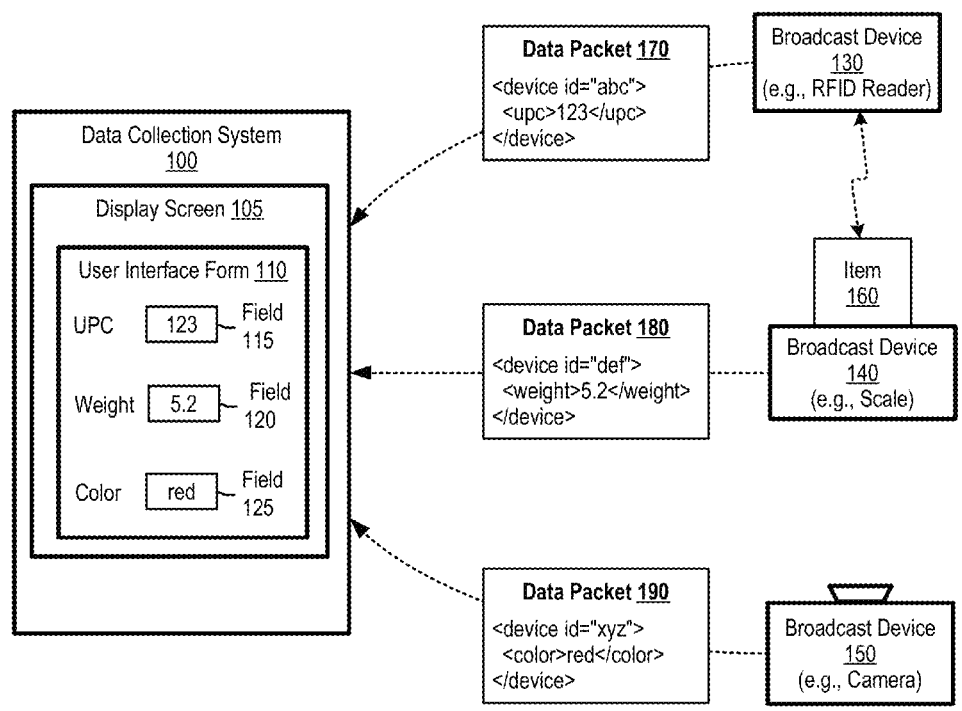
FIG. 1 is a diagram showing a data collection system autonomously receiving data packets from broadcast devices and displaying extracted element values on a user interface form.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a data collection system autonomously receiving data packets from broadcast devices and displaying extracted element values on a user interface form. Data collection system 100 includes display screen 105, which displays user interface forms such as user interface form 110. Data collection system 100 may be, for example, a personal digital assistant, a smart phone, a laptop computer, a netbook, a tablet PC, or other electronic device capable of receiving wireless data.

Each user interface form includes extraction formulas that adhere to an industry-specific schema. For example, a "health care" user interface form may include extraction formulas that adhere to a healthcare-related schema, such as HL7 (Health Level Seven). Each extraction formula includes an "element type" for which the extraction formula matches with element type identifiers included in a received data packet. When a match is found, the extraction formula extracts a corresponding element value from the data packet and displays the element value in an entry field. For example, a health care user interface form may include extraction formulas of:

"/HIPPA_Standard_v2/Patient_Data/Heart/@Rate"
"/HIPPA_Standard_v2/Patient_Data/Heart/@Pressure"

In this example, the data collection device detects data packets broadcast by medical equipment and scans for data packets that include "heart rate" and "blood pressure" information.

The diagram in FIG. 1 shows a warehouse example that includes broadcast devices 130-150 broadcasting data packets 170-190, respectively, which include information pertaining to item 160. Broadcast device 130 may be, for example, an RFID reader that reads item 160's RFID tag, and broadcasts data packet 170 accordingly. Data packet 170 includes an element type identifier "<upc>" and an element value "123". User interface form 110 includes an extraction formula to scan for "upc" element types and, in turn, displays the element value "123" in entry field 115.

Likewise, broadcast device 140 may be, for example, a scale that weights item 160 and includes the weight in data packet 180. User interface form 110 includes an extraction formula to scan for "weight" element types and, in turn, displays the element value "5.2" in entry field 120. Finally, broadcast device 150 may be, for example, a camera that is capable of identifying the color of item 160. In turn, broadcast device 150 includes item 160's color into data packet 190. User interface form 110 includes an extraction formula to scan for "color" element types and, in turn, displays the element value "red" in entry field 120.

Figure 2:
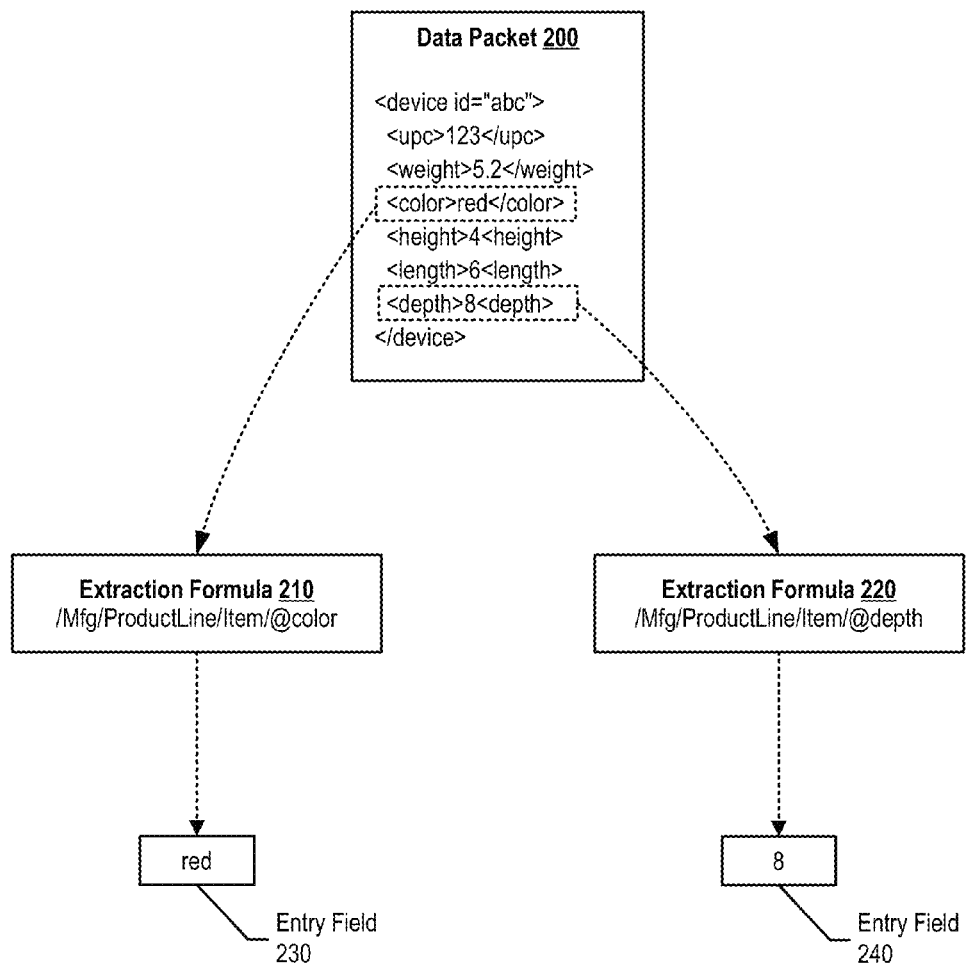
FIG. 2 is a diagram showing extraction formulas extracting relevant data from a data packet that includes multiple element type identifiers.

Due to the fact that user interface form 110 adheres to the same industry-specific schema that broadcast devices 130-150 use to generate data packets 170-190, no prior design considerations are required for autonomous data exchange (see FIG. 2 and corresponding text for further details).

FIG. 2 is a diagram showing extraction formulas extracting relevant data from a data packet that includes multiple element type identifiers. Data packet 200 includes a large amount element type identifiers and corresponding element values. As described herein, by adhering to an industry-specific schema, the order in which the data is organized in data packet 200 is irrelevant. For example, data packet 200 is not required to include "color data" in bit locations 4-6.

Extraction formula 210 includes a "color" element type and, therefore, scans data packet 200 for a matching element type identifier. When found, extraction formula 210 extracts the corresponding element value and displays the element value in entry field 230.

Extraction formula 220 includes a "depth" element type and, therefore, scans data packet for a matching element type identifier. When found, extraction formula 220 extracts the corresponding element value and displays the element value in entry field 240. In both formulas, if data packet 200 does not include matching element type identifiers, extraction formulas 210 and 220 do not populate entry fields 230-240, respectively. In one embodiment, the extraction formulas may display an indication that currently received data packets do not include relevant data, such as "not found," until the extraction formulas receive relevant data packet to extract element values.

Figure 3:
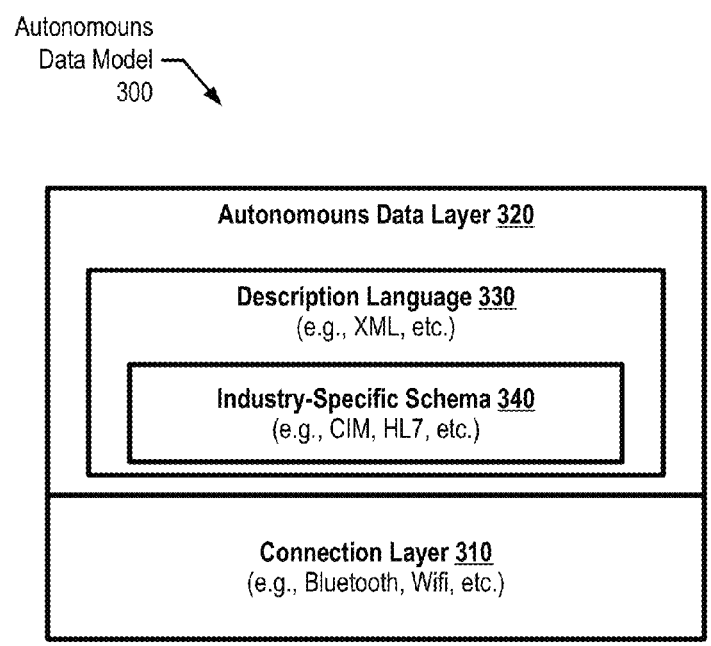
FIG. 3 is a diagram of an autonomous data model that shows the relationship between a wireless connection layer, a description language, and an industry-specific schema.

FIG. 3 is a diagram of an autonomous data model that shows the relationship between a wireless connection layer, a description language, and an industry-specific schema. A data collection system and a broadcast device adhere to autonomous data model 300 in order to autonomously exchange data. Model 300 includes connection layer 310 and autonomous data layer 320. Connection layer 310 identifies a wireless protocol or mechanism, such as Bluetooth, Wifi, etc., that the data collection system and broadcast device utilize to exchange data packets.

Autonomous data layer 320 includes description language 330 and industry-specific schema 340. The data collection system and broadcast device adhere to the same autonomous data layer in order to for the data collection system to interpret information included in the data packets sent from the broadcast device. Description language 330, such as XML, is a computer language that utilizes industry-specific schema 340 to embed relevant information into data packets, such as element type identifiers and element values. Element type identifiers describe the type of data, such as "color" or "weight." FIGS. 4 and 5 provide examples of data packets utilizing a healthcare-specific schema (HL7) and common information model-specific schema (CIM), respectively. The element values provide a value for the corresponding element type identifiers, such as "red" or "5 pounds."

FIG. 4 is a diagram showing an example of data packet information utilizing a healthcare industry-specific schema. Data packet 400 is written in XML and includes element type identifiers corresponding to an HL7 industry-specific schema. Element type identifier 410 ("family") identifies element value 420 ("Smith"). As such, a data collection system that is scanning for patient information may display a user interface form that includes an extraction formula to look for the element type identifier "family." If so, the data collection system loads "Smith" into a corresponding entry field for a user to view.

FIG. 5 is a diagram showing an example of data packet information utilizing a CIM industry-specific schema. Data packet 500 is written in XML and includes element type identifiers corresponding to the CIM industry-specific schema. Element type identifier 510 ("CompanyDescription") identifies element value 520 ("This is a government organization"). As such, a data collection system that is scanning a building to identify resident companies may display a user interface form that includes an extraction formula to look for the element type identifier "CompanyDescription." If so, the data collection system loads "This is a government organization" into a corresponding entry field for a user to view.

Figure 6:
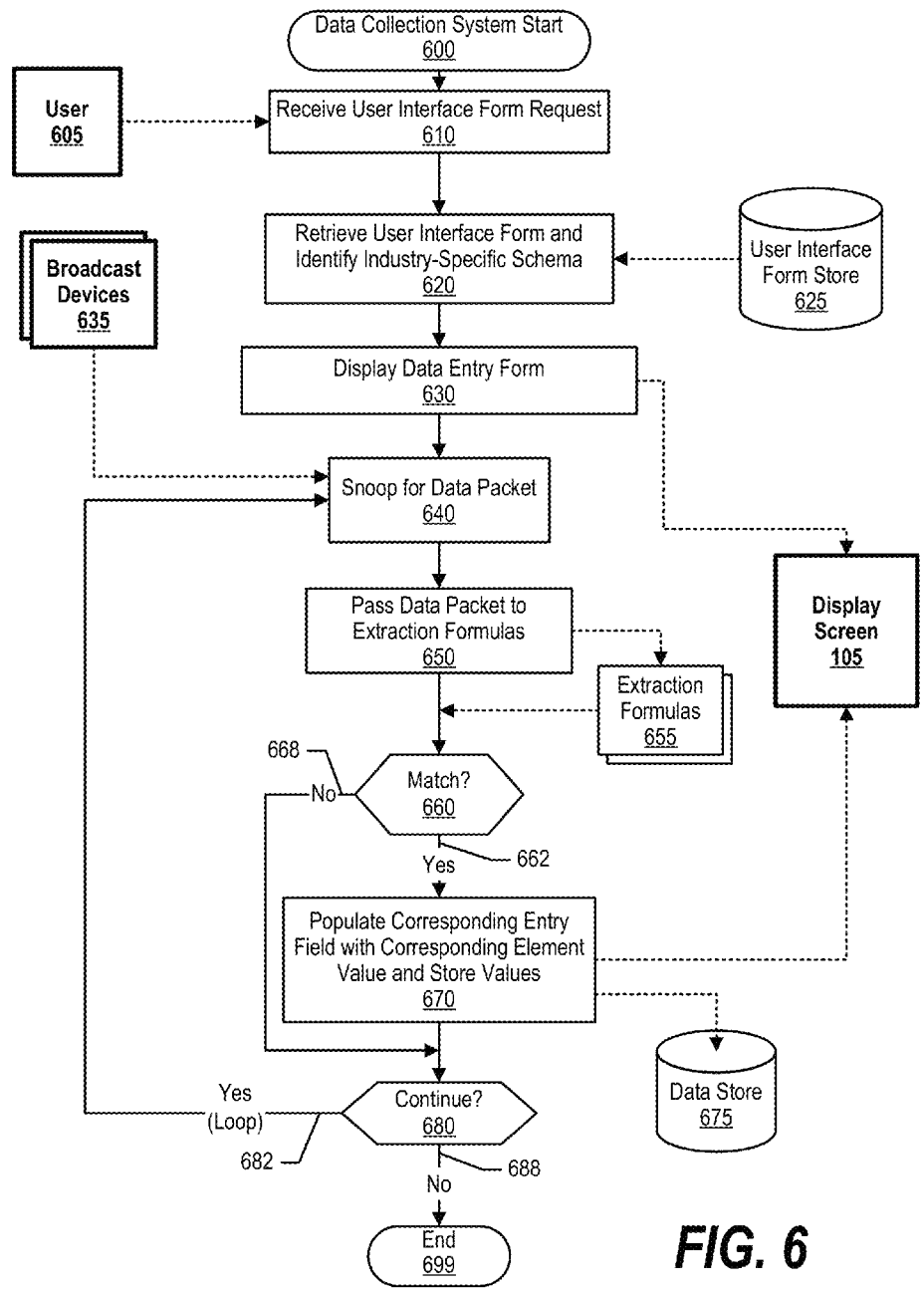
FIG. 6 is a flowchart showing steps taken in a data collection system autonomously collecting data from broadcast devices that adhere to an industry-specific schema similar to a user interface form displayed by the data collection system.

FIG. 6 is a flowchart showing steps taken in a data collection system autonomously collecting data from broadcast devices that adhere to an industry-specific schema similar to a user interface form displayed by the data collection system.

Processing commences at 600, whereupon the data collection system receives a request for a user interface form from user 605 at step 610. For example, user 605 may be in manufacturing and wish to walk a manufacturing floor to collect data. In this example, user 605 may request to load a manufacturing form that includes fields pertaining to a particular type of product that is manufactured on the manufacturing floor.

At step 620, the data collection system retrieves the user interface form from user interface form store 625, and displays the user interface form on display screen 105 (step 630). As discussed herein, the user interface form includes entry fields and corresponding extraction formulas that analyze data packets and extract element values from the data packets when the data packet includes an element type identifier that matches element types included in the extraction formulas. In one embodiment, the data collection system may include an extraction engine that has knowledge of the extraction formulas in the user interface form. In this embodiment, the extraction engine analyzes each packet and provides the element values to the extraction formula if the extraction engine identifies a match. User interface form store 625 may be stored on a volatile or nonvolatile storage area, such as computer memory or a computer hard drive.

The data collection system receives a data packet at step 640 from one of broadcast devices 250. In one embodiment, prior to receiving data packets, the data collection system may wish to identify broadcast devices that adhere to the same industry-specific schema and establish a communication channel with such devices, such as for security purposes (see FIG. 7 and corresponding text for further details). In another embodiment, the data collection system may scan each received data packet to ensure it adheres to the same industry-specific schema as the displayed user interface form. In this embodiment, the data packet may include a schema field that indicates a particular schema (e.g., <schema>HL7<schema>).

At step 650, the data collection system passes the data packet to the extraction formulas 655. Each of extraction formulas 655 evaluate the data packet, and determine whether one of the element type identifiers included in the data packet matches one of the element types included in one of extraction formulas 655 (decision 660). If so, decision 660 branches to "Yes" branch 662, whereupon the data collection system populates one or more entry fields with element values included in the data packet that correspond to the matched extraction formulas, and stores the values in data store 675 (step 670).

In one embodiment, a user may configure the data collection system to store data at particular intervals (e.g., "every three minutes") in order to have enough time to collect different element values from different broadcast devices and store the data as a single file. In this embodiment, data packets received by a particular broadcasting device for a particular item may be processed once even though the broadcast device may be configured to transmit the data packets more frequently (e.g., every 5 seconds).

In another embodiment, the data collection system may accept each real-time database packet from different broadcasting devices. In this embodiment, the data collection device may constantly scan for data packets, while the broadcasting device may be configured to broadcast data packets every 15 seconds. In short, a user may be able to configure the frequency at which the data collection system stores data along with the frequency at which the broadcast devices broadcast the data packets.

The data collection system determines whether to continue snooping for data packets (decision 680). If the data collection system decides to continue snooping, decision 680 branches to "Yes" branch 682, which loops back snoop for more data packets. This looping continues until the data collection system terminates data packet snooping (e.g., user 605 finishes walking the manufacturing floor), at which point decision 680 branches to "No" branch 688 whereupon processing ends at 699.

Figure 7:
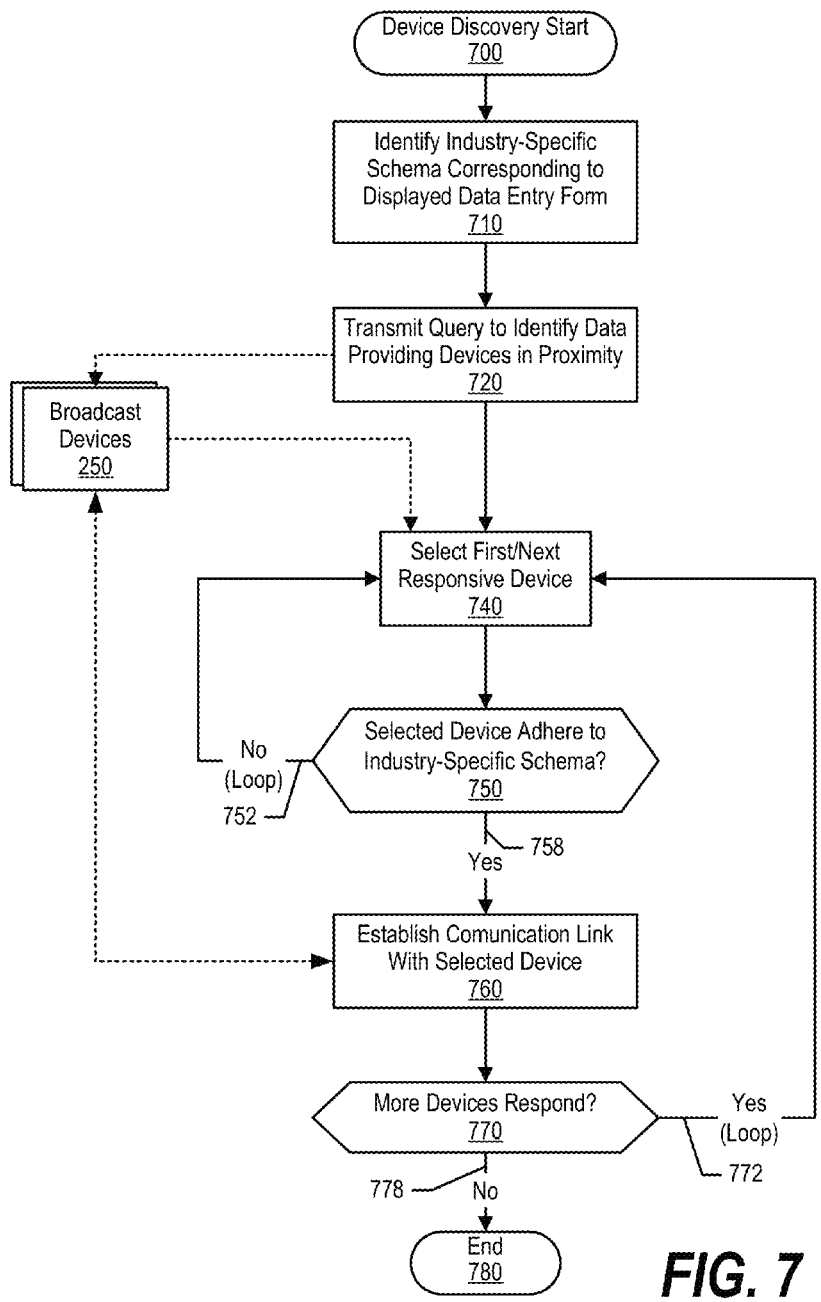
FIG. 7 is a flowchart showing steps taken in a data collection system establishing communication channels with one or more broadcast devices that adhere to an industry-specific schema matching a user interface form displayed on the data collection system's display.

FIG. 7 is a flowchart showing steps taken in a data collection system establishing communication channels with one or more broadcast devices that adhere to an industry-specific schema matching a user interface form displayed on the data collection system's display.

Processing commences at 700, whereupon the data collection system identifies an industry-specific schema that corresponds to extraction formulas included in a currently displayed user interface window (step 710). For example, a doctor may have a data collection system that displays a form that collects a patient's medical information. In this example, the form may include extraction formulas that adhere to an HL7 schema.

At step 720, the data collection system queries broadcast devices 250 to identify schema utilized by broadcast devices 250 to generate data packets. At step 740, the data collection system selects one of broadcast devices 250 that are responsive. A determination is made as to whether the selected broadcast device generates data packets adhering to the same industry-specific schema (decision 750). For example, the data collection system may send a query that request each broadcast device to provide an industry schema indicator to which it adheres. If the selected broadcast device does not adhere to the same industry-specific schema, decision 750 branches to "No" branch 752, which loops back to select the next responsive broadcast device. This looping continues until one of the broadcast devices generates data packets adhering to the same industry-specific schema, at which point decision 750 branches to "Yes" branch 758, whereupon the data collection system establishes a communication link with the selected device at step 760. In one embodiment, the communication link may be a secure communication channel to exchange sensitive information.

A determination is made as to whether there are more broadcast devices that responded to the data collection system's query (decision 770). If so, decision 770 branches to "Yes" branch 772, which loops back to select another broadcast device. This looping continues until there are no more broadcast devices to check, at which point decision 770 branches to "No" branch 778 whereupon processing ends at 780.

Figure 8:
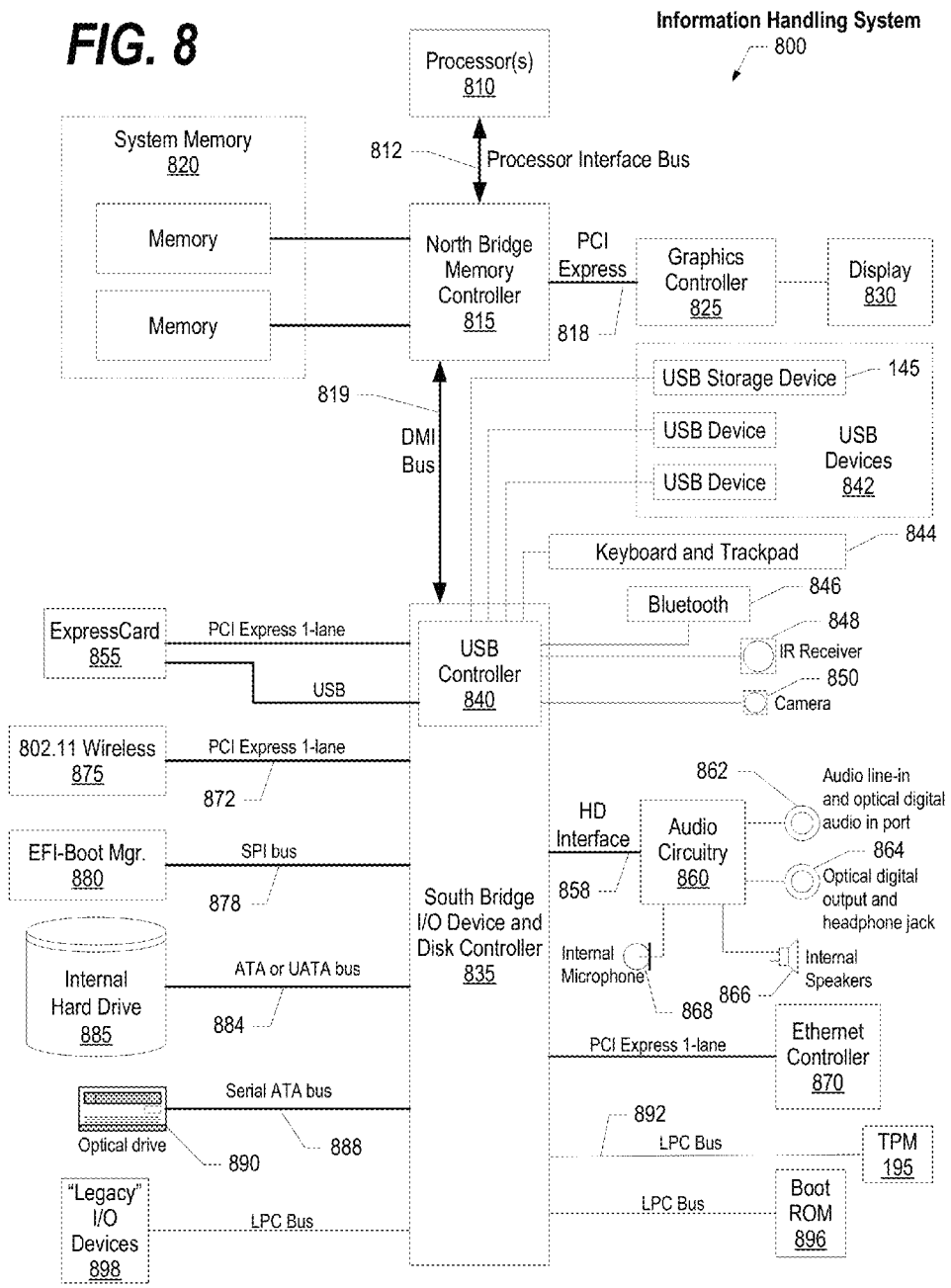
FIG. 8 is a block diagram of a data processing system in which the methods described herein can be implemented.

FIG. 8 illustrates information handling system 800, which is a simplified example of a computer system capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 895) shown in FIG. 8 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 9.

Figure 9:
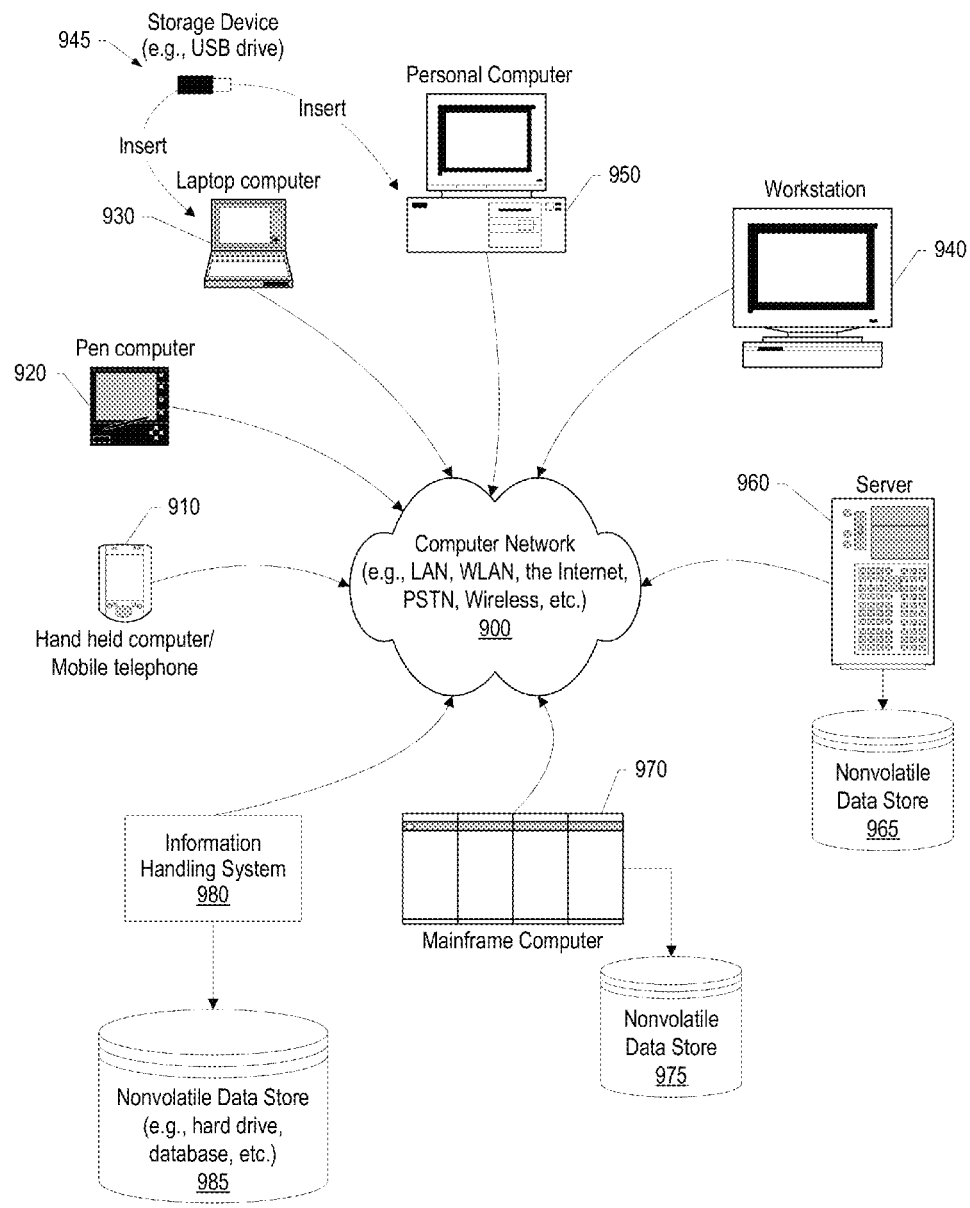
FIG. 9 provides an extension of the information handling system environment shown in FIG. 8 to illustrate that the methods described herein can be performed on a wide variety of information handling systems which operate in a networked environment.

FIG. 9 provides an extension of the information handling system environment shown in FIG. 8 to illustrate that the methods described herein can be performed on a wide variety of information handling systems that operate in a networked environment. Types of information handling systems range from small handheld devices, such as handheld computer/mobile telephone 910 to large mainframe systems, such as mainframe computer 970. Examples of handheld computer 910 include personal digital assistants (PDAs), personal entertainment devices, such as MP3 players, portable televisions, and compact disc players. Other examples of information handling systems include pen, or tablet, computer 920, laptop, or notebook, computer 930, workstation 940, personal computer system 950, and server 960. Other types of information handling systems that are not individually shown in FIG. 9 are represented by information handling system 980. As shown, the various information handling systems can be networked together using computer network 900. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 9 depicts separate nonvolatile data stores (server 960 utilizes nonvolatile data store 965, mainframe computer 970 utilizes nonvolatile data store 975, and information handling system 980 utilizes nonvolatile data store 985). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented in an information handling system comprising:
   loading a user interface form on a display screen, wherein the user interface form includes an entry field and a corresponding extraction formula, the extraction formula including an element type that adheres to an industry-specific schema;
   receiving a data packet that includes an element type identifier and an element value, the element type identifier adhering to the industry-specific schema;
   determining, by the extraction formula, whether the element type identifier matches the element type; and
   in response to determining that the element type identifier matches the element type, populating the entry field on the display screen with the element value.

2. The method of claim 1 further comprising:
   receiving the data packet over a wireless network utilizing a wireless protocol; and
   wherein the industry-specific schema is independent of the wireless protocol.

3. The method of claim 1 further comprising:
   receiving a different data packet that includes a different element type identifier and a different element value;
   determining whether the different data packet adheres to the industry-specific schema; and
   in response to determining that the different data packet fails to adhere to the industry-specific schema, ignoring the different data packet.

4. The method of claim 1 further comprising:
   receiving the data packet autonomously from a broadcast device at a data collection system prior to establishing a communications link between the broadcast device and the data collection system.

5. The method of claim 1 further comprising:
   identifying the industry-specific schema that corresponds to the user interface form;
   querying the broadcast device;
   in response to the querying, determining that the broadcast device provides data packets that adhere to the industry-specific schema; and
   establishing a communication link with the broadcast device, wherein the data packet is received over the established communication link.

6. The method of claim 1 wherein the data packet includes a plurality of element type identifiers and a plurality of corresponding element values, the method further comprising:
   scanning, by the extraction formula, each of the plurality of element type identifiers; and determining, from scanning the plurality of element type identifiers, that the element type identifier matches the element type.

7. The method of claim 1 further comprising:
loading a different user interface form on the display screen, the different user interface form including different extraction formulas that adhere to a different industry-specific schema; and
processing data packets that adhere to the different industry-specific schema.

8. An information handling system comprising:
one or more processors;
a memory coupled to at least one of the processors;
a display screen controlled by one or more of the processors;
a set of computer program instructions stored in the memory and executed by at least one of the processors in order to perform actions of:
loading a user interface form on the display screen, wherein the user interface form includes an entry field and a corresponding extraction formula, the extraction formula including an element type that adheres to an industry-specific schema;
receiving a data packet that includes an element type identifier and an element value, the element type identifier adhering to the industry-specific schema;
determining, by the extraction formula, whether the element type identifier matches the element type; and
in response to determining that the element type identifier matches the element type, populating the entry field on the display screen with the element value.

9. The information handling system of claim 8 wherein the processors perform additional actions comprising:
receiving the data packet over a wireless network utilizing a wireless protocol; and
wherein the industry-specific schema is independent of the wireless protocol.

10. The information handling system of claim 8 wherein the processors perform additional actions comprising:
receiving a different data packet that includes a different element type identifier and a different element value;
determining whether the different data packet adheres to the industry-specific schema; and
in response to determining that the different data packet fails to adhere to the industry-specific schema, ignoring the different data packet.

11. The information handling system of claim 8 wherein the processors perform additional actions comprising:
receiving the data packet autonomously from a broadcast device at a data collection system prior to establishing a communications link between the broadcast device and the data collection system.

12. The information handling system of claim 8 wherein the processors perform additional actions comprising:
identifying the industry-specific schema that corresponds to the user interface form;
querying the broadcast device;
in response to the querying, determining that the broadcast device provides data packets that adhere to the industry-specific schema; and
establishing a communication link with the broadcast device, wherein the data packet is received over the established communication link.

13. The information handling system of claim 8 wherein the data packet includes a plurality of element type identifiers and a plurality of corresponding element values, and wherein the processors perform additional actions comprising:
scanning, by the extraction formula, each of the plurality of element type identifiers; and
determining, from scanning the plurality of element type identifiers, that the element type identifier matches the element type.

14. The information handling system of claim 8 wherein the processors perform additional actions comprising:
loading a different user interface form on the display screen, the different user interface form including different extraction formulas that adhere to a different industry-specific schema; and
processing data packets that adhere to the different industry-specific schema.

15. A computer program product stored in a non-transitory computer readable storage medium, comprising computer program code that, when executed by an information handling system, causes the information handling system to perform actions comprising:
loading a user interface form on a display screen, wherein the user interface form includes an entry field and a corresponding extraction formula, the extraction formula including an element type that adheres to an industry-specific schema;
receiving a data packet that includes an element type identifier and an element value, the element type identifier adhering to the industry-specific schema;
determining, by the extraction formula, whether the element type identifier matches the element type; and
in response to determining that the element type identifier matches the element type, populating the entry field on the display screen with the element value.

16. The computer program product of claim 15 wherein the information handling system performs further actions comprising:
receiving the data packet over a wireless network utilizing a wireless protocol; and
wherein the industry-specific schema is independent of the wireless protocol.

17. The computer program product of claim 15 wherein the information handling system performs further actions comprising:
receiving a different data packet that includes a different element type identifier and a different element value;
determining whether the different data packet adheres to the industry-specific schema; and
in response to determining that the different data packet fails to adhere to the industry-specific schema, ignoring the different data packet.

18. The computer program product of claim 15 wherein the information handling system performs further actions comprising:
receiving the data packet autonomously from a broadcast device at a data collection system prior to establishing a communications link between the broadcast device and the data collection system.

19. The computer program product of claim 15 wherein the information handling system performs further actions comprising:
identifying the industry-specific schema that corresponds to the user interface form;
querying the broadcast device;
in response to the querying, determining that the broadcast device provides data packets that adhere to the industry-specific schema; and
establishing a communication link with the broadcast device, wherein the data packet is received over the established communication link.

20. The computer program product of claim 15 wherein the data packet includes a plurality of element type identifiers and a plurality of corresponding element values, and wherein the information handling system performs further actions comprising:
- scanning, by the extraction formula, each of the plurality of element type identifiers; and
- determining, from scanning the plurality of element type identifiers, that the element type identifier matches the element type.

* * * * *